(12) United States Patent
Takahashi (10) Patent No.: US 7,073,736 B2
(45) Date of Patent: Jul. 11, 2006

(54) SHREDDER DUST ELECTROSTATIC SEPARATION APPARATUS AND METHOD

(76) Inventor: Kenzo Takahashi, 149, Rokkodai 9-chome, Matsudo-shi, Chiba-ken (JP)

( * ) Notice: Subject to any disclaimer, the term of this patent is extended or adjusted under 35 U.S.C. 154(b) by 164 days.

(21) Appl. No.: 10/414,489

(22) Filed: Apr. 16, 2003

(65) Prior Publication Data

US 2003/0226917 A1 Dec. 11, 2003

(30) Foreign Application Priority Data

Apr. 17, 2002 (JP) ............................. 2002-115033
Oct. 11, 2002 (JP) ............................. 2002-298645

(51) Int. Cl.
*B02C 19/12* (2006.01)

(52) U.S. Cl. .................... 241/24.14; 209/3; 209/131; 241/29; 241/79.1

(58) Field of Classification Search ................ 241/29, 241/24.14, 79.1; 209/3, 127.1–131
See application file for complete search history.

(56) References Cited

U.S. PATENT DOCUMENTS

| | | | | |
|---|---|---|---|---|
| 4,578,184 A | * | 3/1986 | Rasmussen | ..................... 209/3 |
| 5,431,347 A | * | 7/1995 | Hayashi et al. | ................ 241/23 |
| 5,542,543 A | * | 8/1996 | Yasukuni | .................. 209/127.1 |
| 6,774,332 B1 | * | 8/2004 | Maehata et al. | ............ 209/128 |

FOREIGN PATENT DOCUMENTS

| | | |
|---|---|---|
| DE | 633097 | 7/1936 |
| EP | 0006826 B1 | 1/1980 |
| EP | 2002059082 | 2/2002 |
| GB | 1036604 A | 7/1966 |
| JP | 52-116659 | 9/1977 |
| JP | 09-104879 | 4/1997 |
| JP | 09220491 | 8/1997 |
| JP | 2000-140699 | 5/2000 |
| JP | 2001-283661 | 10/2001 |
| WO | WO 99/30826 | 6/1999 |

OTHER PUBLICATIONS

Alexandru Iuga et al., "Electrostatic Separation of Metals and Plastics from Granular Industrial Wastes", Industry Applications Conference, 1998, Thirty-Third IAS Annual Meeting, IEEE, New York.
Kohnlechner R., "Copper Separation from Cable Scrap Ecological Recycling of Cable Scrap", Physics Today, American Institute of Physics., May 1, 1994, pp. 342-343, New York.

* cited by examiner

*Primary Examiner*—Mark Rosenbaum
(74) *Attorney, Agent, or Firm*—Heller Ehrman LLP (57) ABSTRACT

A shredder dust electrostatic separation apparatus separates and recovers various kinds of crushed pieces included in shredder dust by the use of electrostatic force. The apparatus includes a rotating drum made of a conductive material, which receives supplied shredder dust, a positive or negative voltage being applied thereon. The apparatus further includes a discharge wire strung along the sideline of the rotating drum. A negative or positive voltage is applied to the discharge wire to cause a discharge in a space between the discharge wire and the rotating drum. The various kinds of crushed pieces included in the shredder dust are charged by the discharge, the polarity of the crushed pieces being opposite to that of the rotating drum. The charged crushed pieces are attracted to the rotating drum. The charges of the crushed pieces are allowed to move to the rotating drum in accordance with the conductivities of the crushed pieces. Accordingly, there are differences in attraction force of the crushed pieces. The crushed pieces are appropriately separated and recovered based on such differences in attraction force.

19 Claims, 4 Drawing Sheets

SHREDDER DUST ELECTROSTATIC SEPARATION APPARATUS AND METHOD

FIELD OF THE INVENTION

The present invention relates to a shredder dust electrostatic separation apparatus and method for electrostatically separating shredder dust, and more particularly, a shredder dust electrostatic separation apparatus and method that are suitable for use in selectively separating copper, polyvinyl chloride, etc., from vehicle shredder dust, for example.

BACKGROUND OF INVENTION

Although technical development in recycling technology with respect to vehicle shredder dust has been encouraged, no promising method has been developed. A conventional way of treating shredder dust is recovering weakly magnetic materials such as stainless and nonferrous metals from shredder dust by the use of a separation apparatus, and burying the residue, since it has been found difficult to further separate the residue.

However, there is a problem in burying the residue of shredder dust in that oil and/or heavy metal may seep into the peripheral soil, thereby contaminating the surrounding environment. In addition, nowadays, the number of landfill treatment sites is not sufficient. There is also a problem in that incineration of shredder dust, i.e., incineration of various materials contained in shredder dust, may lead to the generation of dioxin.

SUMMARY OF THE INVENTION

Having identified the above-described problems, the inventors have developed the following solution, which is embodied in the present invention. The solution involves a method to appropriately separate and recover shredder dust, thereby effectively using resources.

In one embodiment, the present invention provides a shredder dust electrostatic separation apparatus for separating and recovering a number of crushed pieces constituting shredder dust by the use of electrostatic force. The apparatus includes: a rotating drum, formed of a conductive material, wherein a positive or negative voltage is applied, and wherein shredder dust is received; and a discharge wire which is sprung along the sideline of the rotating drum at a position opposing to the rotating drum, generates a discharge in a space between the rotating drum and itself, thereby charging the crushed pieces of the shredder dust so as to have a polarity that is opposite to that of the rotating drum. The charged crushed pieces are attracted to the rotating drum, the charges of the crushed pieces are moved to the rotating drum at speeds determined in accordance with the conductivities of the crushed pieces so as to vary the attraction force of the respective crushed pieces with respect to the rotating drum, thereby separating and recovering the respective crushed pieces.

In one aspect, the present invention further includes a supply feeder for supplying the shredder dust to the rotating drum.

In another aspect, the present invention further includes a dryer for drying the shredder dust.

In yet another aspect, the present invention further includes a charge-eliminating device for eliminating charges from the crushed pieces of the shredder dust.

In another aspect, more than one discharge wires can be provided, each discharge wire being connected to a capacitor for storing a charge.

In yet another aspect, each wire may be connected to a capacitor for storing a charge.

In another aspect, a plurality of chutes for separating and recovering the shredder dust are located below the rotating drum and along a rotation direction of the rotating drum.

Another embodiment of the present invention is a shredder dust electrostatic separation method for separating and recovering a number of crushed pieces constituting shredder dust using an electrostatic force. The method includes the following steps: supplying shredder dust to a rotating drum, wherein the shredder dust comprises a conductive material, and wherein a positive or negative voltage is applied; applying a negative or positive voltage to a discharge wire sprung along the sideline of the rotating drum at a position opposing to the rotating drum, thereby generating a discharge in a space between the discharge wire and the rotating drum in order to charge the crushed pieces of the shredder dust so as to have a polarity that is opposite to that of the rotating drum; and allowing the charged crushed pieces to adhere to the rotating drum. While the charged crushed pieces are adhering to the rotating drum, allowing the charges of the crushed pieces to move to the rotating drum at speeds determined in accordance with the conductivities of the crushed pieces, thereby varying the attraction force of the respective crushed pieces with respect to the rotating drum, in order to separate and recover the respective crushed pieces.

In yet another embodiment, a shredder dust electrostatic separation method according to the present invention includes: recovering copper pieces from crushed shredder dust in a size of 6 mm or less through an electrostatic separation; re-crushing the crushed shredder dust having been subjected to the recovery of the copper pieces; and recovering polyvinyl chloride pieces from the re-crushed shredder dust through the electrostatic separation.

In another embodiment, a shredder dust electrostatic separation method according to the present invention includes: separating coated conductive wires in shredder dust into coatings and copper wires; crushing the shredder dust; and performing a copper piece recovery through an electrostatic separation, and a first polyvinyl chloride piece recovery through the electrostatic separation for recovering copper pieces and polyvinyl chloride pieces from the shredder dust.

In one embodiment, a shredder dust electrostatic separation method according to the present invention includes: separating coated conductive wires in shredder dust into coatings and copper wires; crushing the shredder dust; separating the shredder dust in a size of 3–5 mm into heavyweight materials, medium-weight materials, and lightweight materials through a specific gravity separation; and recovering nonferrous metals from the heavyweight materials, recovering the copper wires from the medium-weight materials, and recovering polyvinyl chloride from the medium-weight materials having been subjected to the recovery of the copper wires and the lightweight materials.

In another embodiment, a shredder dust electrostatic separation method of the present invention includes: crushing waste materials containing coated conductive wires to make shredder dust; recovering ferrous metals, nonferrous metals, and stainless from the shredder dust; crushing the remaining shredder dust so as to be in a size of 3 to 5 mm or less; removing copper pieces and polyvinyl chloride pieces from the shredder dust through an electrostatic separation; and removing plastic pieces through a thermal decomposition or a gasification melting, thereby finally obtaining carbon pieces.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate a present embodiment of the invention, and, together with the general description given above and the detailed description of the embodiments given below, serve to explain the principles of the invention.

DESCRIPTION OF THE PREFERRED EMBODIMENT

Reference will now be made in detail to present embodiments of the invention, an example of which is illustrated in the accompanying drawings. Wherever possible, the same reference numerals will be used to designate the same or similar parts.

Figure 1:
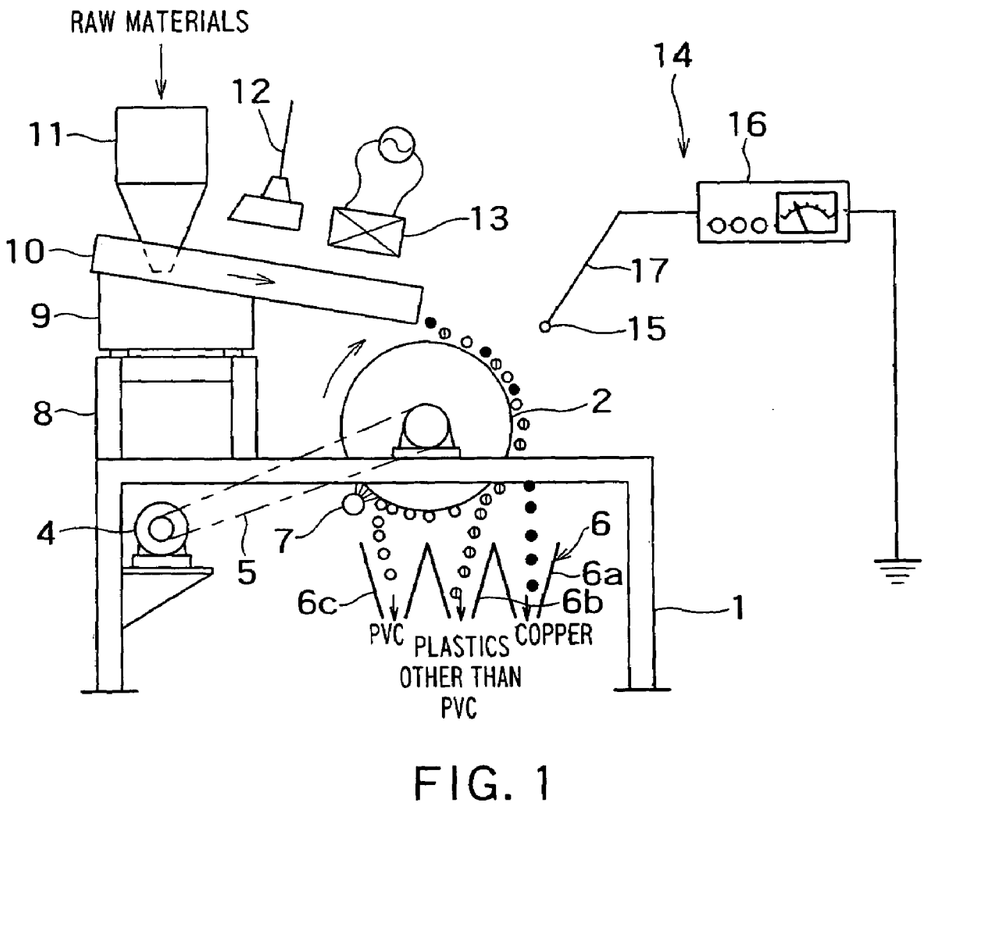
FIG. 1 is a diagram showing an example of an electrostatic separation apparatus according to an embodiment of the present invention.

FIG. 1 shows a shredder dust electrostatic separation apparatus, to which the present invention is applied.

This embodiment will be briefly described below.

Drying treatment and charge elimination treatment are performed on shredder dust obtained by crushing end-of-life vehicles. The shredder dust is positively charged. Among various kinds of crushed pieces contained in the shredder dust, there are crushed pieces in which conductivity is high. If such crushed pieces contact a grounded conductive rotating drum, charges thereof instantaneously move to the drum, and the crushed pieces are no longer positively charged. Such crushed pieces are no longer attracted to the grounded rotating drum, but fall away therefrom. Crushed pieces with a medium level of conductivity are attracted to the drum due to the charges thereof. However, these crushed pieces gradually lose their charges and fall away from the rotating drum. Crushed pieces with a low conductivity are attracted to the rotating drum due to the charges thereof, and remain attracted since they hardly lose their charges. Thus, in this embodiment, various kinds of crushed pieces constituting the shredder dust are separated based on the differences in their conductivity. Hereinafter, this embodiment will be described in more detail.

First, a structure of the apparatus according to the embodiment of the present invention will be described.

The apparatus includes a frame 1 serving as a static system. A rotating drum 2 is rotatably attached to the upper portion of the frame 1, the rotating drum 2 being supported by an axis fixed to the top of the frame 1. The rotating drum 2 continuously feeds the shredder dust so as to separate and recover useful materials. The rotating drum 2 is grounded, and is made of a conductive material. A motor 4 for driving the rotating drum 2 is fixed inside the frame 1. The torque of the motor 4 is conveyed to the rotating drum 2 via a chain 5. Separation and recovery chutes (hereinafter also referred to as "chutes") 6a, 6b, and 6c, for separating and recovering the shredder dust as described above, are arranged along the rotating direction of the drum 2. A brush 7 disposed above the separation and recovery chute 6c so as to contact the rotating drum 2 is for scraping shredder dust (polyvinyl chloride pieces) attracted to the rotating drum 2 at the last moment. A platform 8 is placed on the frame 1, to which a supply feeder 10 is attached via a vibration device 9 so as to be tilted forward. The vibration device 9 vibrates the shredder dust on the supply feeder 10 to uniformly spread the shredder dust, and convey it to the rotating drum 2. For this purpose, the forward end of the supply feeder 10 is placed above the rotating drum 2.

A supply hopper 11 for supplying the shredder dust to the upstream side of the supply feeder 10 is provided above the supply feeder 10. A dryer 12 for drying the shredder dust is provided at the downstream side of the supply feeder 10. Further, a charge-eliminating device 13 for eliminating the charge of the crushed pieces of the shredder dust is provided downstream from the dryer 12.

A discharging device 14 is located above and downstream from the rotating drum 2. The discharging device 14 is for causing corona discharge in a space between the rotating drum 2 and itself. The shredder dust is positively charged due to the corona discharge. More specifically, the discharging device 14 includes an electrode (discharge wire) 15 in the shape of a wire strung along the sideline of the rotating drum 2 and a high voltage power supply device 16 for supplying power to the electrode 15. The high voltage power supply device 16 includes an output capacitor (not shown) therein, which is connected to the discharge wire 15 via a high voltage cable 17. The discharge wire 15 is strung so as to be in parallel with the sideline of the rotating drum 2.

Next, the operation of this apparatus will be described.

(1) Drying Treatment and Charge Elimination Treatment of Shredder Dust

Shredder dust (raw materials) containing crushed pieces of copper, polyvinyl chloride (PVC), plastics other than polyvinyl chloride (plastics other than PVC), etc. is supplied from the supply hopper 11. The "plastics other than PVC" include, but are not limited to, acrylic, nitrile, butadiene, styrene, polystyrene, polyethylene, polypropylene, polyethylene terephthalate, etc. The supplied raw materials are uniformly spread, and fed forward by the vibrating supply feeder 10 while being dried by the dryer 12. Generally, end-of-life vehicles are crushed with water being sprinkled thereon so as to prevent the ignition of flammables. The crushed pieces are to be further crushed so that the size thereof becomes approximately, but not limited to, 10 mm or less. Such re-crushed pieces generally have a moisture content of approximately, but not limited to, 5 to 6%. In this embodiment, attention is paid to this fact, and the contained moisture is removed in advance in order to effectively separate the raw materials based on their own conductivities. A heat-type dryer and a hot-air dryer can be used to dry the raw materials at a drying temperature of approximately, but not limited to, 60° C. to 100° C. The drying treatment is not necessarily performed during the feeding of the shredder dust by the supply feeder 10 as in the case of this embodiment, but can be performed in a separate drying step in advance. However, the drying efficiency is higher in this embodiment, where a combination effect utilizing the vibration of the supply feeder 10 can be obtained, than in the case where a separate drying step is performed.

After the drying treatment, the materials are subjected to AC corona discharge from the charge-eliminating device 13 in the next stage, by which the charges thereof are eliminated. Generally, the raw materials are charged by, the frictions between crushed pieces during the various treatments, before being supplied to the supply hopper 11. When the separation of the materials is performed based on the conductivities of the materials as in the case of this embodiment, all the materials should meet the same criteria (i.e., their charge should be zero) before they are subjected to the separation treatment. Accordingly, the charges of the raw materials should be eliminated to meet such a condition. The charge elimination treatment as described above enables the separation of the specific plastics from a plurality of plastics each having a different conductivity. It is sufficient if the frequency of the alternating field generated by the charge eliminating device 13 is approximately between, but not limited to, 20 to 30 Hz, and the field intensity thereof is approximately, but not limited to, 20 kV or less.

After the charge elimination treatment, the raw materials are supplied to the grounded conductive rotating drum 2, which is rotated in the direction shown by an arrow in FIG. 1, from the end of the supply feeder 10. The rotational speed of the rotating drum 2 is approximately between, but not limited to, 20 to 60 rpm, and for one embodiment, the rotating drum 2 is a stepless speed change mechanism. If the rotating drum 2 is made of SUS304 or SS400, it is possible to plate it with hard chrome.

(2) Separation and Recovery Treatment of Shredder Dust

Thus far, explanations have been made on the treatments of shredder dust before the separation treatment. Hereinafter, the separation treatment of shredder dust, which is the characteristic feature of the present invention, will be described.

As described above, after the drying and the charge elimination treatment, the shredder dust is supplied to the rotating drum 2. Positive corona discharge is caused between the rotating drum 2 and the discharge wire 15 utilizing a positive high voltage from the high voltage power supply 16. In an embodiment the voltage applied to the discharge wire 15 is at a maximum of 50 kV, and can be varied in accordance with the intended purpose thereof. It is possible to apply a negative voltage to the discharge wire 15, and to apply a positive voltage to the rotating drum 2, thereby producing a negative corona discharge in order to carry out the present invention.

The positive charges produced as a result of the corona discharge move by several factors, such as electric field between the discharge wire 15 and the rotating drum 2, diffusion, etc., and adhere to the raw materials falling toward the rotating drum 2 or being rotated with the rotating drum 2, thereby charging them.

If copper pieces, which have a high conductivity, are charged while falling from the supply feeder 10 toward the rotating drum 2, they lose their charges via the rotating drum 2 immediately after they reach the rotating drum 2. Charges received by copper pieces on the rotating drum 2 also move via the grounded rotating drum 2. Accordingly, the copper pieces are not attracted to the rotating drum 2, but they move along the rotation of the rotating drum 2 and fall toward chute 6a. Thus, the chute 6a mainly recovers copper pieces. The pieces of plastics other than PVC, which have a medium level of conductivity, are positively charged and attracted to the rotating drum 2 that is negatively charged. Then, these plastic pieces gradually lose their charges, and fall away from the rotating drum 2 toward the chute 6b immediately after they completely lose their charges. Thus, the chute 6b mainly recovers pieces of plastics other than PVC. Polyvinyl chloride, which has a low conductivity, is positively charged and attracted to the rotating drum 2 that is negatively charged, as in the case of the other plastics. However, since the positive charges of polyvinyl chloride are difficult to lose, polyvinyl chloride pieces, unlike the other plastic pieces, remain attracted to the rotating drum 2, and are finally scraped by the brush 7 and fall toward the chute 6c. Thus, the chute 6c mainly recovers polyvinyl chloride pieces. As described above, it is possible to appropriately separate the crushed pieces constituting the raw materials based on the differences in the conductivity of the crushed pieces.

Figure 2:
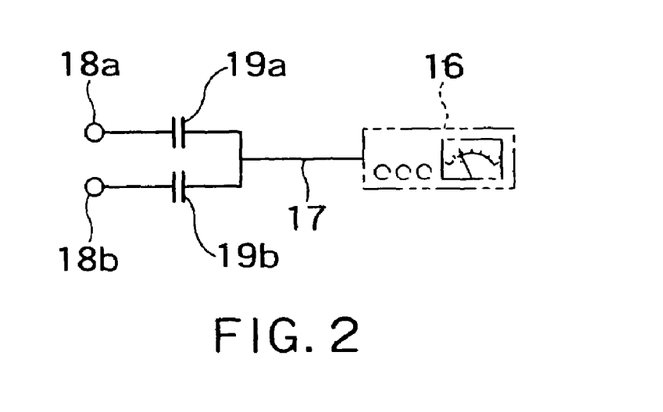
FIG. 2 is a modification of the discharge wire 15 of the discharging device 14 in FIG. 1.

FIG. 2 shows a modified example of the discharge wire 15 of the discharging device 14. In the above-described embodiment, there may be a case where arc discharge occurs between the discharge wire 15 and a large-particle shredder dust on the rotating drum 2. In such a case, there is a concern that the discharge from the high voltage power supply 16 stops until its output capacitor is recharged, resulting in that the operation of the separation apparatus is interrupted. It is possible to ensure the operation of the separation apparatus even in such a case by constituting the discharging device with two discharge wires as shown in FIG. 2. This discharging device will be described in more detail below. The discharging device as shown in FIG. 2 includes two discharge wires 18a and 18b, which are connected to the high voltage power supply 16 via capacitors 19a and 19b. The rest of this device is identical to the discharging device shown in FIG. 1. With such a structure, the following advantageous effects can be obtained. In the above-described embodiment, if there are large crushed pieces in the raw materials, arc discharge may occur between such crushed pieces and the discharge wire 15 when the crushed pieces pass between the rotating drum 2 and the discharge wire 15. If such a phenomenon takes place, the electric energy charged in the output capacitor connected to the discharge wire 15 is instantaneously discharged. As a result, the corona discharge may stop until the capacitor is supplied with the charge necessary to cause corona discharge, resulting in that the separating operation is not carried out while the corona discharge is stopped. If the discharging device has the structure as shown in FIG. 2, even if arc discharge occurs between the crushed pieces and one of the discharge wires 18a and 18b, the other may continue to operate. Accordingly, it is possible to stably carry out the separating operation. Of course, it is possible to change the number of the discharge wires depending on the intended purpose.

The explanations have been made on the operation of the respective devices in FIG. 1. Hereinafter, explanations will be made on the shredder dust separating operation as a whole.

Figure 3:
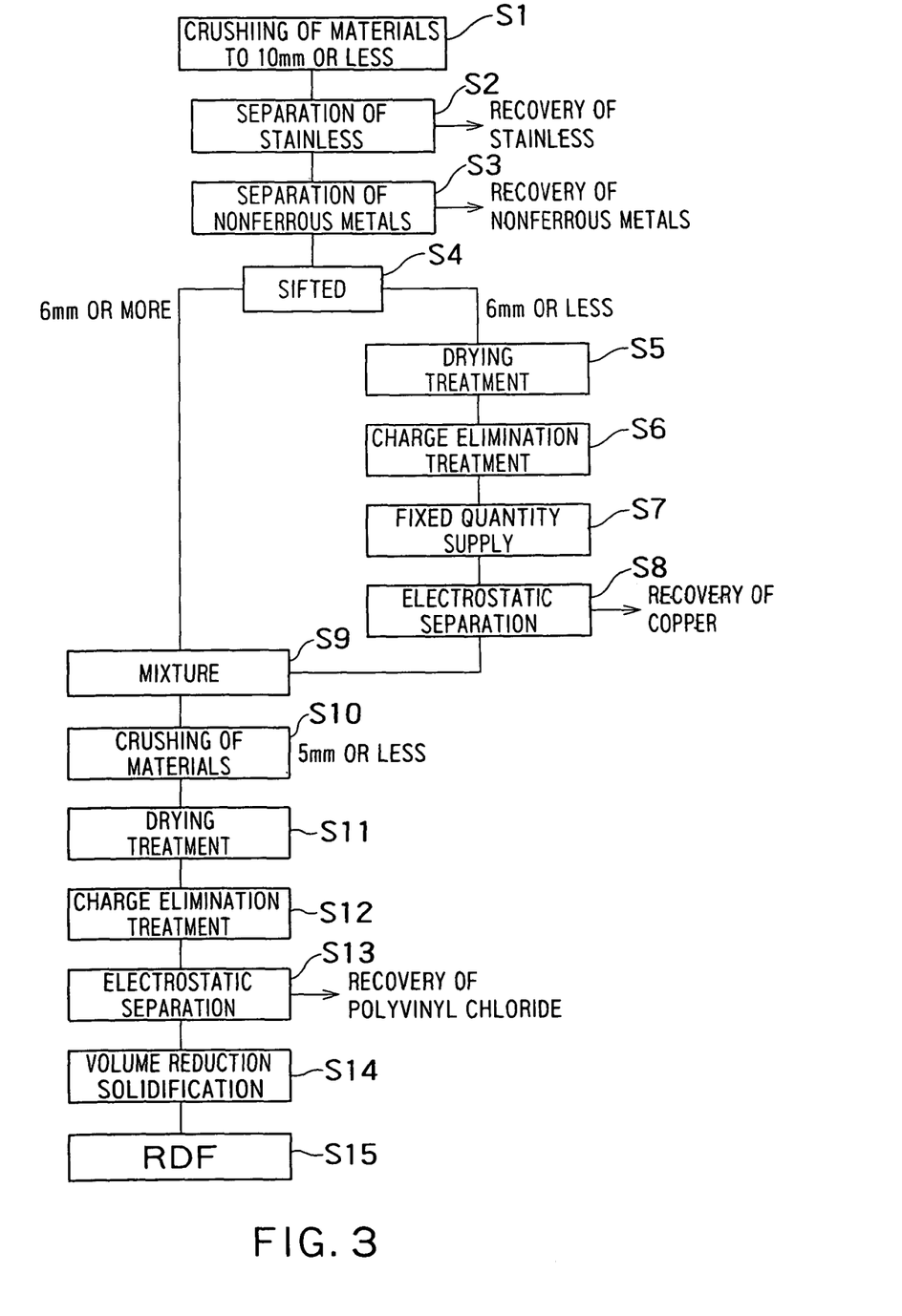
FIG. 3 is a flow chart showing a method of recovering copper and polyvinyl chloride contained in the shredder dust.

FIG. 3 is a flow chart showing an example of recovery method for effectively recovering copper (including copper wires) and polyvinyl chloride, which may particularly cause problems in a time when the shredder dust be fuel.

This method is an invention of the present inventor. The separation apparatus as shown in FIG. 1 is separately used in the copper recovery step (S5–S8) and the polyvinyl chloride recovery step (S10–S13).

Hereinafter, each step of the flow chart of FIG. 3 will be described with reference to FIG. 1.

As can be understood from FIG. 3, the shredder dust is crushed to become crushed pieces having a size of approximately, but not limited to, 10 mm or less in order to effectively recover copper and polyvinyl chloride in the shredder dust (S1).

Stainless pieces included in the crushed pieces are recovered by a stainless separation device, with a magnetic field strength of approximately, but not limited to, 15,000 G or more (S2).

Nonferrous metal pieces contained in the remaining shredder dust are recovered by a nonferrous metal separation device, with a magnetic field strength of approximately, but not limited to, 4,500 G (S3). As a result, the remaining shredder dust mainly contains copper, polyvinyl chloride (PVC), and plastics other than PVC.

The remaining shredder dust is sifted to separate larger pieces (approximately, but not limited to, 6 mm or more) from smaller pieces (approximately, but not limited to, 6 mm or less) (S4).

The smaller pieces are passed through the separation apparatus as shown in FIG. 1, thereby recovering copper pieces. That is, as shown in FIG. 1, the moisture contained in the smaller pieces is evaporated by the dryer 12 (S5). Charges of the dried smaller pieces are eliminated by the charge-eliminating device 13 (S6). The smaller pieces are supplied to the rotating drum 2 in units of even (fixed) quantity (S7). Copper pieces contained in the smaller pieces follow the rotation of the rotating drum 2 and fall away therefrom. The chute 6a mainly recovers copper pieces (S8). After the copper pieces are recovered, the remaining pieces are mixed with the larger pieces (S9).

The mixed crushed pieces are further crushed so that the size thereof becomes approximately, but not limited to, 5 mm or less (S10).

The re-crushed pieces are passed through the separation apparatus as shown in FIG. 1 again to recover polyvinyl chloride pieces. The re-crushed pieces are subjected to the drying treatment carried out by the dryer 12 (S11), and the charge elimination treatment carried out by the charge-eliminating device 13 (S12). The re-crushed pieces are evenly supplied to the rotating drum 2, charged by the corona discharge from the discharge wire 15, and attracted to the rotating drum 2. The plastic pieces other than PVC fall away from the rotating drum 2 when the attraction force thereof is weakened. The chute 6b mainly recovers the plastic pieces other than PVC. PVC pieces are scraped by the brush 7. The chute 6c mainly recovers PVC pieces (S13). The plastic pieces other than PVC thus recovered are solidified with their volume reduced (S14) to make RDF (refuse derived fuel) (S15). The copper pieces and the PVC pieces are also recycled.

The recovery percentage of the copper pieces is approximately, but not limited to, 98% or more. Since the PVC pieces are often intertwined with fabrics in shredder dust, the recovery percentage of the PVC pieces is approximately, but not limited to, 90% or more.

According to the embodiment of the present invention, it is possible to appropriately separate and recover the shredder dust since various kinds of crushed pieces are electrostatically separated based on the conductivities thereof.

Further, since the drying treatment and the charge elimination treatment are performed before the separation treatment of the shredder dust, it is possible to appropriately separate and recover the various kinds of crushed pieces in the shredder dust, the conductivities of which are slightly different from each other.

Since the number of discharge wires for causing corona discharge can be increased to more than one, even if one of the discharge wires fails, the apparatus can keep operating using the other discharge wires. Thus, it is possible to stably operate the apparatus.

Furthermore, since it is possible to effectively separate and recover copper and PVC from the shredder dust, which may particularly cause problems, it is possible to appropriately make RDF from plastics other than PVC.

Figure 4:
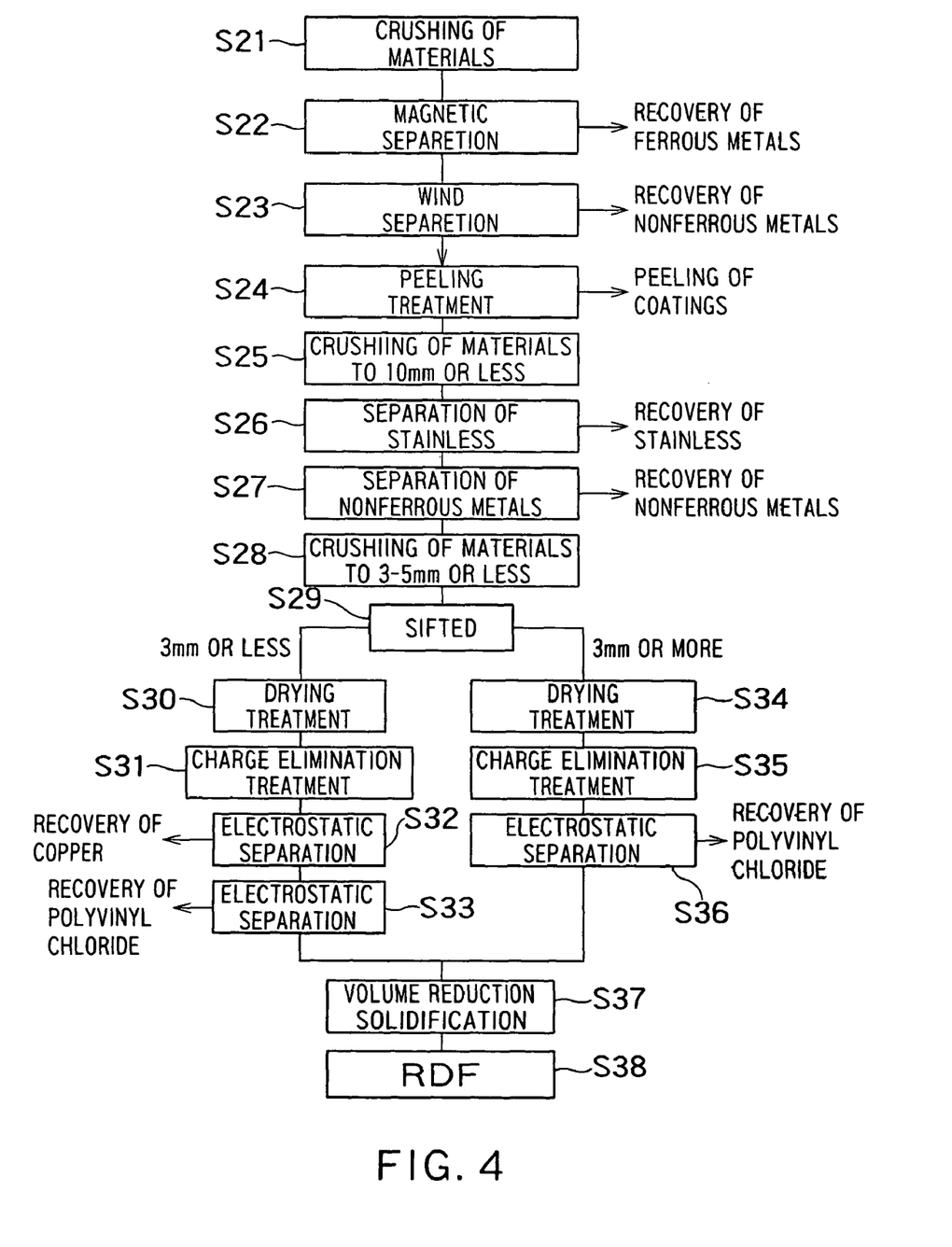
FIG. 4 is a flow chart showing another example of a recovery method.

FIG. 4 is a flow chart showing another example of the recovery method, which is the invention of the present inventor, like FIG. 3. The remarkable difference between FIGS. 4 and 3 is that in step S24, coated copper wires are separated into copper wires and coatings, thereby ensuring that copper wires do not erroneously spread and fall to the chutes 6b and 6c, but reliably fall to the chute 6a in FIG. 1 in the electrostatic separation step, which is performed in the later stage.

This will be described in more detail below.

If the coating portions and the copper wire portions of coated copper wires are not appropriately separated from each other in advance, it is not possible to appropriately separate the coating portions and the copper wire portions in the electrostatic separation step. For example, if the coating remains at only a portion of a copper wire, this wire may be classified into the copper group since the characteristics of copper determines the result of the classification. On the contrary, if the coating remains all over the copper wire, the wire may be classified into the plastic group since the characteristics of the coating determines the result of the classification. Either way, the degree of the separation of the coating from copper wire has an influence on the separation result.

Accordingly, the present inventor has paid attention to the importance of separating copper wires and coatings in advance. In order to achieve this purpose, a volume reduction machine can be used, for example, to compress the shredder dust after being subjected to the treatment of step S23 in FIG. 4. The shredder dust including the coated copper wires is heated and half-melted due to the compression and friction heat, and then solidified. During this process, the coated copper wires are separated into the coating portions and the copper wire portions. Ultimately, the dust pieces having a size of approximately, but not limited to, 3 mm or less include the mixture of copper wires and small plastic pieces (including PVC pieces), and the dust pieces having a size of approximately, but not limited to, 3 mm or more include the mixture of plastic pieces (including PVC pieces) and a minute amount (0.1%) of copper wire. In this way, it is possible to ensure appropriate separation and recovery in the later stage.

Hereinafter, this process will be described in more detail with reference to the flow chart of FIG. 4.

In FIG. 4, the steps having the same captions as those in FIG. 3 represent the same treatments.

First, steps S21–S23 will be reviewed. These steps have not been mentioned with reference to the flow chart of FIG. 3, but are so-called "pretreatments" for obtaining shredder dust. That is, the object dust is crushed (S21), ferrous metals are recovered through magnetic separation (S22), and nonferrous metals are recovered through wind separation (S23).

The peeling treatment, which is one of the characteristic features of this embodiment, is carried out (S24) to separate the coatings from the copper wires. This treatment is carried out by using a volume reduction machine to compress the shredder dust having been subjected to the treatment of step S23, thereby heating and melting the coatings of the coated copper wires, and the obtained coatings are solidified. The solidified coatings are crushed again. Thus, the coated copper wires are separated into the copper wires and the coatings.

The treatment process proceeds to step S25. The treatments in step S25 to step S27 are substantially the same as those in step S1 to S3 in FIG. 3.

The treatment process proceeds to step S28 to crush the shredder dust having been subjected to the above-described steps into a size of approximately, but not limited to, 3–5 mm or less.

The shredder dust is sifted to separate the dust pieces having a size of approximately, but not limited to, 3 mm or less from the dust pieces having a size of approximately, but not limited to, 3 mm or more (S29). The dust pieces having a size of approximately, but not limited to, 3 mm or less contain copper pieces and small plastic pieces (including PVC pieces), and the dust pieces having a size of approximately, but not limited to, 3 mm or more contain only plastic (including PVC) pieces. The dust pieces having a size of approximately, but not limited to, 3 mm or less are subjected to the drying treatment (S30) and the charge elimination treatment (S31).

The electrostatic separation is carried out (S32, S33) to recover copper pieces and PVC pieces. Since the copper wires and the coatings have already been separated from each other as described above, the copper pieces are not put into incorrect chutes, but are securely recovered by the chute 6a.

On the other hand, the dust pieces having a size of approximately, but not limited to, 3 mm or less are subjected to the drying treatment (S34), and the charge elimination treatment (S35). The electrostatic separation is carried out (S36) to recover PVC pieces.

The volume reduction treatment (S37) and the RDF treatment (S38) are carried out to ultimately obtain RDF.

Another embodiment of the present invention will be described below with reference to FIG. 5.

Figure 5:
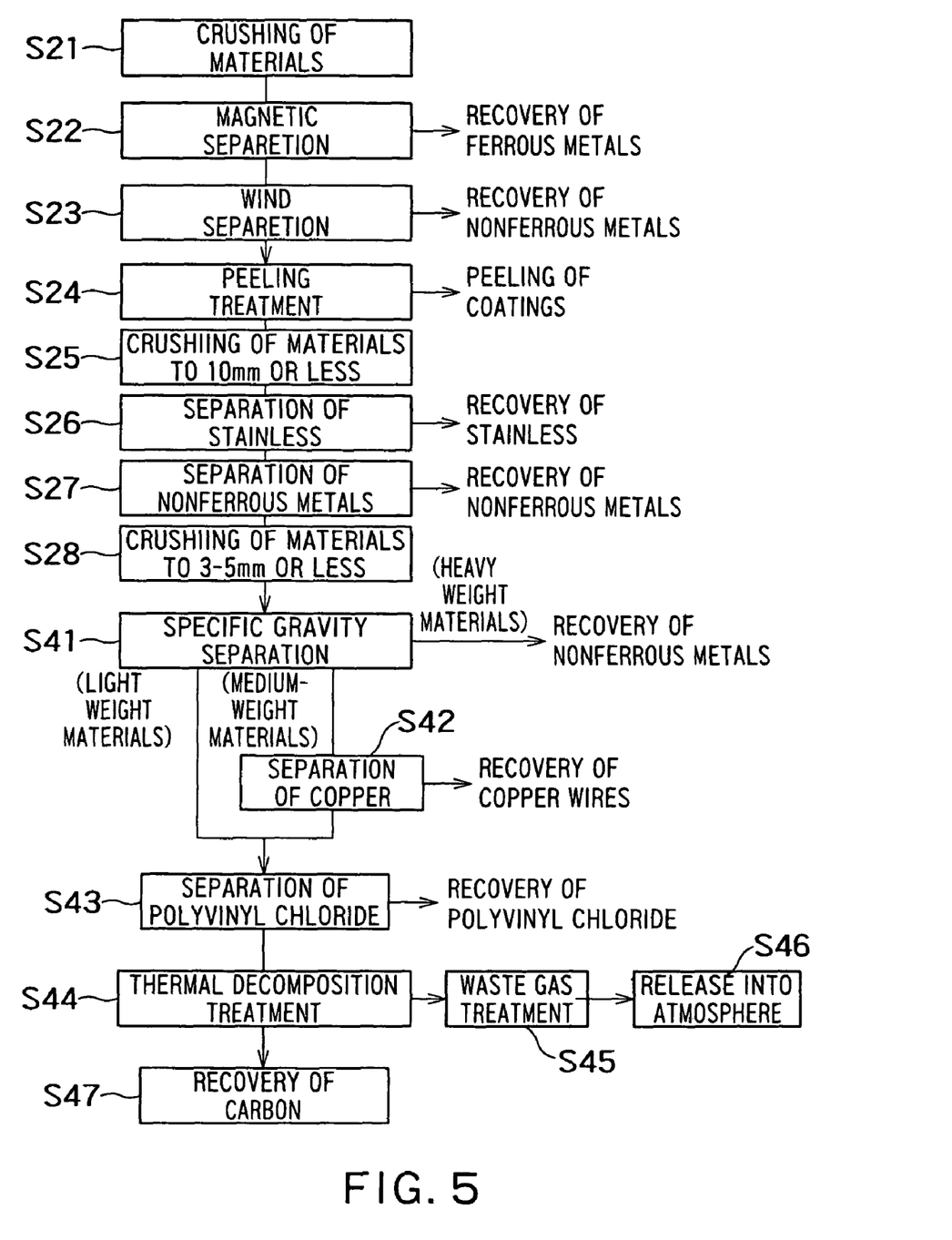
FIG. 5 is a flow chart showing a further example of a recovery method.

In the flow chart of FIG. 5, steps S21–S28 are substantially the same as steps S21–S28 of the flow chart of FIG. 4.

In FIG. 5, the crushing treatment attempts to obtain dust pieces having a size of approximately, but not limited to, 3–5 mm or less in step S28, the specific gravity separation treatment is carried out in step S41 to separate the shredder dust into heavyweight materials, medium-weight materials, and lightweight materials by a general-purpose specific gravity separation device. Since this specific gravity separation device is popular, no detailed explanation is made therefor, but briefly, the operation thereof is as follows. A dust support plate is set with inclines of approximately, but not limited to, 3 to 4 degrees in a back and forth direction, and of approximately, but not limited to, 4 to 6 degrees in a left and right direction. There are a number of 100-mesh holes in the dust support plate, which is fanned almost perpendicularly from downward while being vibrated. As a result, the heavyweight materials move forward, the lightweight materials are blown up by the wind, and move backward along the inclines, and the medium-weight materials are blown up by the wind and stay at their original position. Accordingly, the shredder dust is sorted into three groups. This separation method is well known.

The "heavyweight materials" include nonferrous metals such as aluminum, copper, etc. Copper collected here does not include that from coated copper wires such as Litz wires, which are obtained by twisting fine copper wires and used for electrical connection, but are from single thick copper wires used to pass high current. Most of the "medium-weight materials" (for example, 99% or more) are plastic pieces, and the rest are nonferrous metals, such as copper from coated copper wires such as Litz wires, aluminum powder, etc. In step S42, copper (fine) wires are recovered from the medium-weight materials by the above-described electrostatic separation apparatus (copper separation apparatus). After the copper separation, most of the residue is plastic pieces, e.g., rigid plastic pieces, and the content of copper in the residue is, for example, 0.5% or less. Most of the lightweight materials (for example, 99.9% or more) are plastic pieces. The lightweight materials and the plastics in the residue after the copper separation (step S42) are passed through the above-described electrostatic separation apparatus (PVC separation apparatus) to recover PVC pieces (step S43). Once copper and PVC pieces are removed, the residual plastic pieces are thermally decomposed at about 3,000° C. (step S44). The size and cost of a thermal decomposition device for carrying out the thermal decomposition treatment can be reduced by using a plasma furnace. Independent from the thermal decomposition treatment, waste gas treatment is carried out on the residual plastics (step S45), and the obtained gas is released into the atmosphere (step S46). Since the plastic pieces are thermally decomposed (step S44), pure or high-purity carbon can be recovered as the residue (step S47). Carbon can be reused to make various kinds of things, so that it is not necessary to bury carbon as the industrial waste. It is possible to replace the above-described thermal decomposition treatment (step S44) with the gasification melting power generation. Regardless of whether the thermal decomposition treatment is selected or the gasification melting power generation is selected, it is possible to operate a thermal decomposition treatment plant or a gasification melting power generation plant without any problem if the treatments described above have been carried out before the thermal decomposition treatment or the gasification melting power generation. Thus, the above-described treatments are important pretreatments which are carried out before the above plants are operated.

As described above, since copper wires and polyvinyl chloride are removed before the thermal decomposition treatment in the above process, it is possible to reliably recover carbon through thermal decomposition treatment, etc. Although the size of crushed materials in the above explanation is approximately, but not limited to, 3–5 mm or less, the size is not strictly limited thereto, but can be in the range of approximately, but not limited to, 3–8 mm.

Thus, according to the present invention, it is possible to appropriately separate and recover shredder dust since the various kinds of materials each having different conductivity contained in the shredder dust are electrostatically separated.

Other embodiments of the present invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A shredder dust electrostatic separation method, comprising:
    recovering copper pieces from crushed shredder dust in a size of 6 mm or less through an electrostatic a first electrostatic separation;
    re-crushing the crushed shredder dust having been subjected to the recovery of the copper pieces; and
    recovering polyvinyl chloride pieces from the re-crushed shredder dust through the a second electrostatic separation.

2. A shredder dust electrostatic separation method according to claim 1, wherein the re-crushing step re-crushes the crushed shredder dust having been subjected to the recovery of the copper pieces to be in a size of 5 mm or less.

3. The shredder dust electrostatic separation method according to claim 1, wherein the crushed shredder dust in the size of 6 mm or less is obtained by first crushing shredder dust so as to be in a size of 10 mm or less, recovering stainless pieces and nonferrous metal pieces therefrom, and sifting the remaining shredder dust.

4. The shredder dust electrostatic separation method according to claim 3, wherein the crushed shredder dust having been subjected to the recovery of the copper pieces is mixed with the crushed shredder dust in a size of 6 mm or more obtained as a result of the sifting of the remaining shredder dust, and the re-crushing of the crushed shredder dust and the recovering of the polyvinyl chloride pieces are performed.

5. The shredder dust electrostatic separation method according to claim 3, wherein the crushed shredder dust in the size of 6 mm or less is dried and charge thereof is eliminated.

6. The shredder dust electrostatic separation method according to claim 3, wherein the re-crushed shredder dust in the size of 5 mm or less is dried and charge thereof is eliminated.

7. The shredder dust electrostatic separation method according to claim 1, wherein at least one of the first and second electrostatic separation separations includes:
supplying shredder dust to a rotating drum,
wherein the shredder dust comprises of a conductive material, and
wherein a positive or negative voltage is applied;
applying a negative or positive voltage to a discharge wire sprung along a sideline of the rotating drum at a position opposing to the rotating drum, thereby generating a discharge in a space between the discharge wire and the rotating drum to charge the crushed pieces of the shredder dust to have a polarity that is opposite to the polarity of the rotating drum; and
allowing the charged crushed pieces to adhere to the rotating drum, and while the charged crushed pieces are adhering to the rotating drum, allowing the charges of the crushed pieces to move to the rotating drum at speeds determined in accordance with the conductivities of the crushed pieces, thereby varying the attraction force of the respective crushed pieces with respect to the rotating drum, to separate and recover the respective crushed pieces.

8. The shredder dust electrostatic separation method according to claim 1, the shredder dust is solidified with its volume reduced in order to obtain refuse derived fuel.

9. A shredder dust electrostatic separation method, comprising:
separating coated conductive wires in shredder dust into coatings and copper wires;
thereafter crushing the shredder dust, wherein
the crushing of the shredder dust includes a first crushing for crushing the shredder dust so as to be in a size of 10 mm or less, and a second crushing for crushing the shredder dust so as to be in a size of 3 to 5 mm or less, and
the second crushing is performed after stainless pieces and nonferrous metal pieces are recovered from the shredder dust having been subjected to the first crushing; and thereafter performing a copper piece recovery through an electrostatic separation, and then a first polyvinyl chloride piece recovery through the electrostatic separation for recovering copper pieces and polyvinyl chloride pieces from the shredder dust.

10. The shredder dust electrostatic separation method according to claim 9, wherein in the performing step, the first polyvinyl chloride piece and the polyvinyl chloride pieces from the shredder dust is in a size of 3 mm or less.

11. The shredder dust electrostatic separation method according to claim 9, further comprising performing a second polyvinyl chloride piece recovery through the electrostatic separation for recovering the polyvinyl chloride pieces from the shredder dust in a size of 3 mm or more, which has been subjected to the crushing.

12. The shredder dust electrostatic separation method according to claim 9, further comprising sifting the shredder dust having been subjected to the second crushing so as to separate crushed pieces in a size of 3 mm or less from crushed pieces in a size of 3 mm or more.

13. The shredder dust electrostatic separation method according to claim 12, wherein the respective crushed pieces in the size of 3 mm or less, and in the size of 3 mm or more, which are separated in the sifting of the shredder dust, are dried and charges thereof are eliminated before being subjected to the first polyvinyl chloride piece recovery and the second polyvinyl chloride piece recovery.

14. The shredder dust electrostatic separation method according to claim 13, wherein plastics other than PVC in the shredder dust having been subjected to the first polyvinyl recovery and the second polyvinyl recovery are solidified with their volume reduced in order to obtain refuse derived fuel.

15. The shredder dust electrostatic separation method according to claim 9, wherein the electrostatic separation includes:
supplying shredder dust to a rotating drum,
wherein the shredder dust comprises of a conductive material, and
wherein a positive or negative voltage is applied;
applying a negative or positive voltage to a discharge wire sprung along the sideline of the rotating drum at a position opposing to the rotating drum, thereby generating a discharge in a space between the discharge wire and the rotating drum in order to charge the crushed pieces of the shredder dust to have a polarity that is opposite to that of the rotating drum; and
allowing the charged crushed pieces to adhere to the rotating drum, and while the charged crushed pieces are adhering to the rotating drum, allowing the charges of the crushed pieces to move to the rotating drum at speeds determined in accordance with the conductivities of the crushed pieces, thereby varying the attraction force of the respective crushed pieces with respect to the rotating drum, to separate and recover the respective crushed pieces.

16. A shredder dust separation method, comprising:
separating coated conductive wires in shredder dust into coatings and copper wires;
crushing the shredder dust,
wherein the crushing of the shredder dust includes a first crushing for crushing the shredder dust so as to be in a size of 10 mm or less, and a second crushing for crushing the shredder dust so as to be in a size of 3–5 mm or less, and wherein the second crushing is performed after stainless pieces and nonferrous metal pieces are recovered from the shredder dust having been subjected to the first crushing;

separating the shredder dust in a size of 3–5 mm into heavyweight materials, medium-weight materials, and lightweight materials through a specific gravity separation; and recovering nonferrous metals from the heavyweight materials, recovering the copper wires from the medium-weight materials, and recovering polyvinyl chloride from the medium-weight materials having been subjected to the recovery of the copper wires and the lightweight materials.

17. The shredder dust separation method according to claim 16, further comprising an electrostatic separation including:

supplying shredder dust to a rotating drum, which is formed of a conductive material, wherein a positive or negative voltage is applied;

applying a negative or positive voltage to a discharge wire sprung along the sideline of the rotating drum at a position opposing to the rotating drum, thereby generating a discharge in a space between the discharge wire and the rotating drum in order to charge the crushed pieces of the shredder dust so as to have a polarity that is opposite to that of the rotating drum; and allowing the charged crushed pieces to adhere to the rotating drum, and while the charged crushed pieces are adhering to the rotating drum, allowing the charges of the crushed pieces to move to the rotating drum at speeds determined in accordance with the conductivities of the crushed pieces, thereby varying the attraction force of the respective crushed pieces with respect to the rotating drum, to separate and recover the respective crushed pieces.

18. The shredder dust separation method according to claim 16, wherein after the recovery of copper wires and polyvinyl chloride, plastics in the shredder dust are thermally decomposed to recover carbon.

19. A shredder dust electrostatic separation method, comprising:

a first crushing of waste materials containing coated conductive wires to make shredder dust in a size of 10 mm or less;

recovering ferrous metals, nonferrous metals, and stainless from the shredder dust;

a second crushing of the remaining shredder dust so as to be in a size of 3 to 5 mm or less;

removing copper pieces and polyvinyl chloride pieces from the shredder dust through an electrostatic separation; and removing plastic pieces through a thermal decomposition or a gasification melting, thereby finally obtaining carbon pieces.

* * * * *